UNITED STATES PATENT OFFICE.

DAVID G. ELDER, OF CHICKAMAUGA, GEORGIA.

COMPOSITION FOR TREATING RUBBER TIRES, &c.

1,203,720.

Specification of Letters Patent.

Patented Nov. 7, 1916.

No Drawing.

Application filed April 7, 1913. Serial No. 759,441.

*To all whom it may concern:*

Be it known that I, DAVID G. ELDER, of Chickamauga, in the county of Walker, and in the State of Georgia, have invented a certain new and useful Improvement in Compositions for Treating Rubber Tires, &c., and do hereby declare that the following is a full, clear, and exact description thereof.

The object of my invention is to provide a composition for the automatic treatment, so to speak, of the inner rubber tubes of pneumatic tires for the cure, or practical prevention of punctures, which will possess the important qualities of efficiently performing such operation; non-impairment of the rubber, stability of a condition for efficiency through the life of the tire, or as long as the outer casing lasts; insensibility to wide extremes of temperature; and non-interference with the action of the valve.

My composition is in the form of a fluid, that may be introduced into the tire through the valve, and as I preferably prepare it, it contains a paste made of flour; plaster of Paris; prepared chalk, bismuth subnitrate; rose water and alcohol four per cent. solution Q. s. thoroughly mixed. These ingredients I prefer to use in the following quantities:

|  | Apothecaries' measurement. |
|---|---|
| Flour paste | 16 oz. |
| Plaster of Paris | 1 oz. |
| Prepared chalk | 2 oz. |
| Bismuth sub-nitrate | 1 oz. |
| Rose water | 2 oz. |
| Caramel | 1 dram. |
| Alcohol 4% solution | Q. s, 1 quart. |

The proportions named need not be strictly followed, although I prefer them.

My composition does not injure rubber; it does not harden, but remains liquid; its sealing action is very rapid; it does not seal or gum up the valve; it stops leaks around the valve; it restores old, porous inner tubes to a condition practically as good as new.

The flour paste forms the body of the composition; the plaster of Paris and the prepared chalk are used for a filler; the bismuth subnitrate prevents the plaster of Paris hardening, and the rose water is used to give a pleasant odor or perfume. The rose water is also useful since it does not freeze and because of its remaining about an even temperature. The alcohol protects the liquid from low temperature or freezing. The caramel by reason of its sticky nature, acts as an adhesive, and it imparts a brown color to the composition.

Having thus described my invention what I claim is—

1. A rubber tire treating composition containing a paste, plaster of Paris, chalk, a perfuming medium, alcohol and bismuth subnitrate in proportions substantially set forth in the specification.

2. A rubber tire treating composition in liquid form, containing a paste, plaster of Paris, chalk, alcohol, bismuth subnitrate, and a perfuming medium in proportions substantially set forth in the specification.

3. A rubber tire treating composition in liquid form containing a paste, plaster of Paris, chalk, bismuth subnitrate, rose water, and alcohol in proportions substantially set forth in the specification.

4. A rubber tire treating composition in liquid form containing a paste, plaster of Paris, chalk, bismuth subnitrate, rose water, caramel, and alcohol in proportions substantially set forth in the specification.

In testimony that I claim the foregoing I have hereunto set my hand.

DAVID G. ELDER.

Witnesses:
W. M. HOUSCH,
D. F. PLESS.